United States Patent [19]
Fridlund

[11] Patent Number: 5,257,688
[45] Date of Patent: Nov. 2, 1993

[54] DEVICE FOR DIVIDING A COLLECTION OF ELONGATED WOOD PIECES AND PIECEMEAL CROSS FEEDING THEREOF IN A DIRECTION AWAY FROM THE COLLECTION PLACE

[75] Inventor: Per-Erik Fridlund, Nyland, Sweden
[73] Assignee: Interlog AB, Nyland, Sweden
[21] Appl. No.: 859,312
[22] PCT Filed: Apr. 29, 1991
[86] PCT No.: PCT/SE91/00306
  § 371 Date: May 26, 1992
  § 102(e) Date: May 26, 1992
[87] PCT Pub. No.: WO91/17100
  PCT Pub. Date: Nov. 14, 1991
[30] Foreign Application Priority Data
  May 8, 1990 [SE] Sweden .................. 9001631
[51] Int. Cl.⁵ ........................................ B65G 47/12
[52] U.S. Cl. .................................. 198/443; 198/774.1
[58] Field of Search .................. 198/443, 773, 774.1, 198/774.2, 774.3, 774.4

[56] References Cited
U.S. PATENT DOCUMENTS

| | | | |
|---|---|---|---|
| 2,995,235 | 8/1961 | Maier, Jr. | 198/443 X |
| 4,624,614 | 11/1986 | Levad et al. | 198/774.3 X |
| 4,933,074 | 6/1990 | Fuller, Jr. et al. | 198/774.1 X |

FOREIGN PATENT DOCUMENTS

| | | | |
|---|---|---|---|
| 2847366 | 7/1979 | Fed. Rep. of Germany | 198/774.1 |
| 1331751 | 8/1987 | U.S.S.R. | 198/774.1 |
| 1442474 | 12/1988 | U.S.S.R. | 198/774.1 |

*Primary Examiner*—D. Glenn Dayoan
*Attorney, Agent, or Firm*—Gifford, Groh, Sprinkle, Patmore and Anderson

[57] ABSTRACT

A device for dividing a collection of wood pieces and piecemeal cross feeding thereof in a direction away from the collection place comprises a feeding arrangement (2), which is moveable reciprocatingly in a substantially rectilinear, sloping movement path (3) for feeding the wood pieces along a rising support path (4). The feeding arrangement and the support path both have a stairs-like design with a plurality of steps (6, 7), which in profile have substantially similar form and each of which comprises a first portion (9) sloping upwardly in the direction of rise of the support path followed by a downwardly sloping second portion (10). The steps (6, 7) of the feeding arrangement and the support path are mutually displaced, viewed perpendicularly to the first portions (9) of the steps, with a measure smaller than the length ($l_2$) of the second portions (10). The first portions (9) of the steps (6, 7) of the feeding arrangement as well as the support path have a steeper slope than the movement path (3).

6 Claims, 5 Drawing Sheets

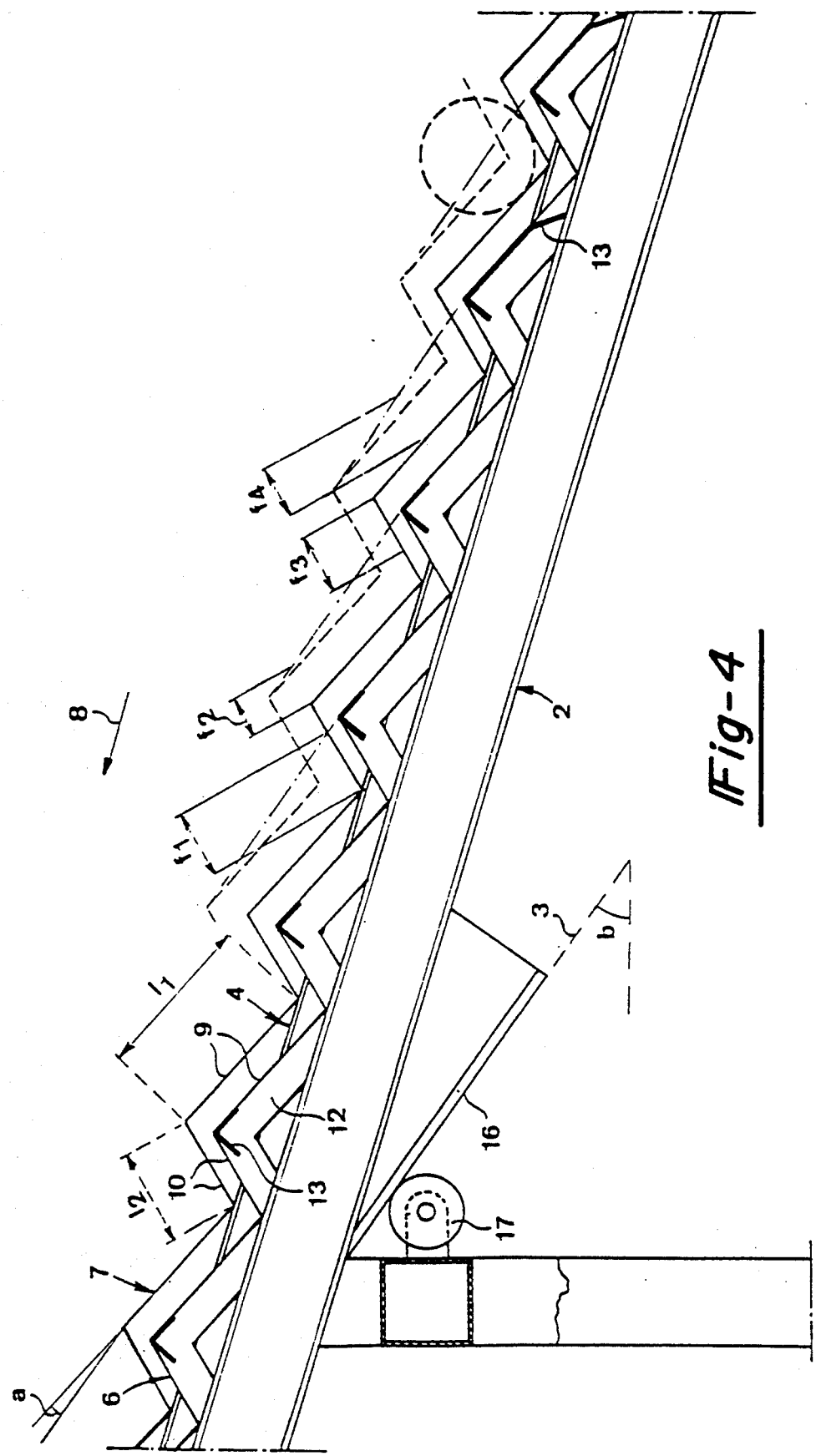

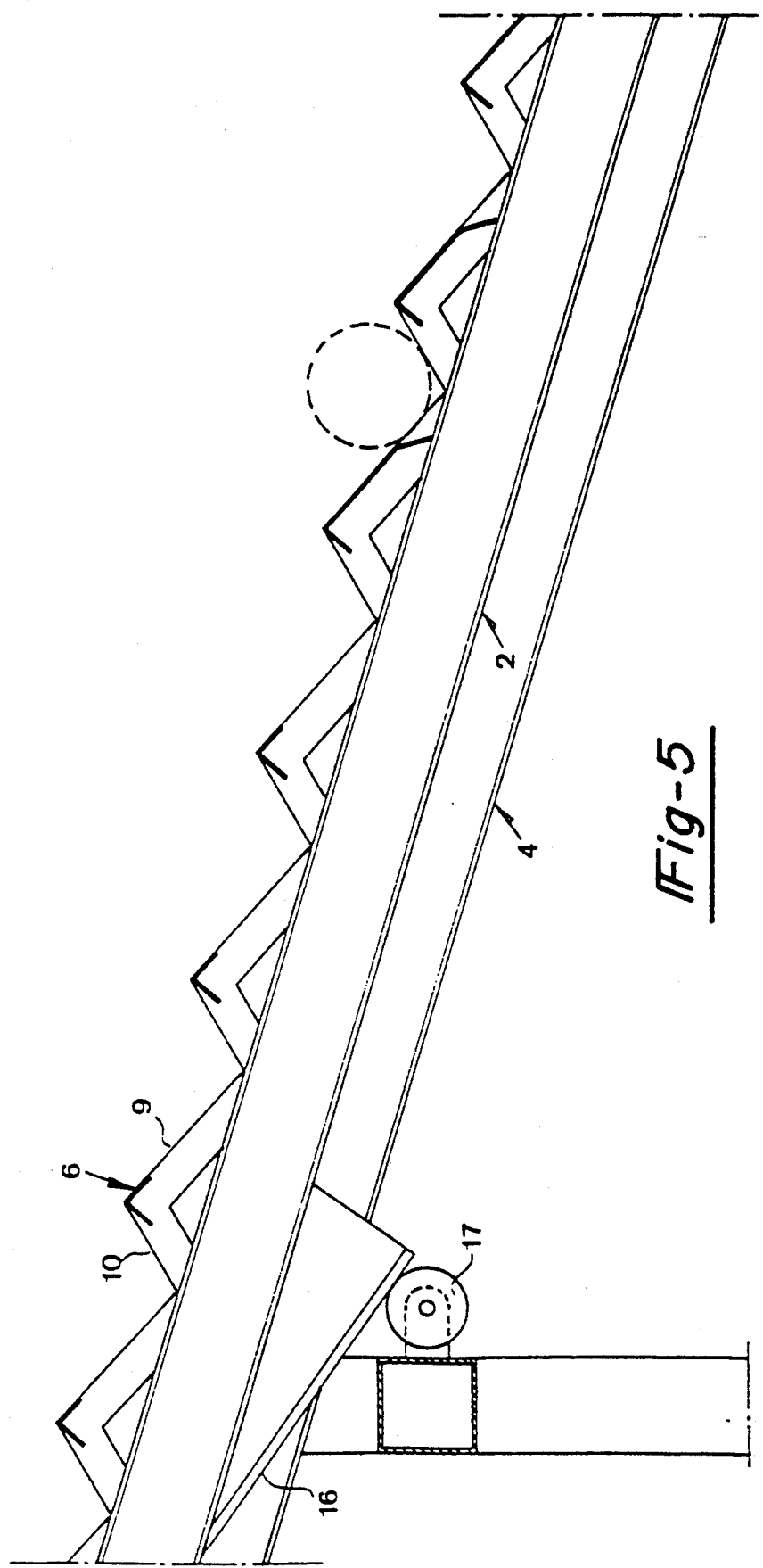

DEVICE FOR DIVIDING A COLLECTION OF ELONGATED WOOD PIECES AND PIECEMEAL CROSS FEEDING THEREOF IN A DIRECTION AWAY FROM THE COLLECTION PLACE

FIELD OF THE INVENTION AND PRIOR ART

This invention is related to a device for dividing or splitting a collection of elongated wood pieces, in particular round timber pieces, and piecemeal cross feeding thereof in a direction away from the collection place in accordance with the precharacterizing part of the enclosed claim 1.

Such a device is described in our Swedish patent publication No. 449 476. The known device has turned out to be very preferable and has resulted in a great commercial success.

According to the embodiment example in the patent publication 449 476, the first portions of the steps of the feeding arrangement and the support path are entirely parallel to the rectilinear, sloping path of movement in the device known. This means that the second portions of the steps of the feeding arrangement always will protrude equally far beyond the first portions of the steps of the support path on movement upwardly of the feeding arrangement.

SUMMARY OF THE INVENTION

The object of the present invention is to develop the device known so as to optimize its feeding operation and capacity.

This object is according to the invention obtained by the structural design defined in the characterizing part of claim 1.

Accordingly, this design involves that the second portions of the feeding arrangement will project to a differing degree beyond the first portions of the support path on movement of the feeding arrangement. This is a consequence of the different slope of the movement path and the first portions of the steps of the feeding arrangement as well as the support path. More specifically, the second portions of the feeding arrangement will, at the time of contact against a wood piece, project fairly far beyond the first portions of the steps of the support path whereas this projection successively decreases when the wood piece is displaced upwardly along the first portions of the steps of the support path. This is preferable since the inertia at the time of contact makes the tendency of a wood piece to inadvertently roll backwardly over the forwardly feeding step is particularly great at that time. Thus, the design according to the invention makes it possible to operate the device with a high pace of the feeding arrangement without inadvertent rolling backwardly of wood pieces in the higher range of coarseness.

Preferable optimizations within the scope of the basic concept of the invention are subject of the dependent claims.

BRIEF DESCRIPTION OF THE DRAWINGS

With reference to the appended drawings, a more specific description of an embodiment example of the invention will follow hereinafter.

In the drawings;

FIG. 4 is an enlarged side view of a part of the device according to FIG. 1; and FIG. 5 is a view similar to FIG. 4 but illustrating the device in another operational position.

DETAILED DESCRIPTION OF A PREFERRED EMBODIMENT

Figure 1:
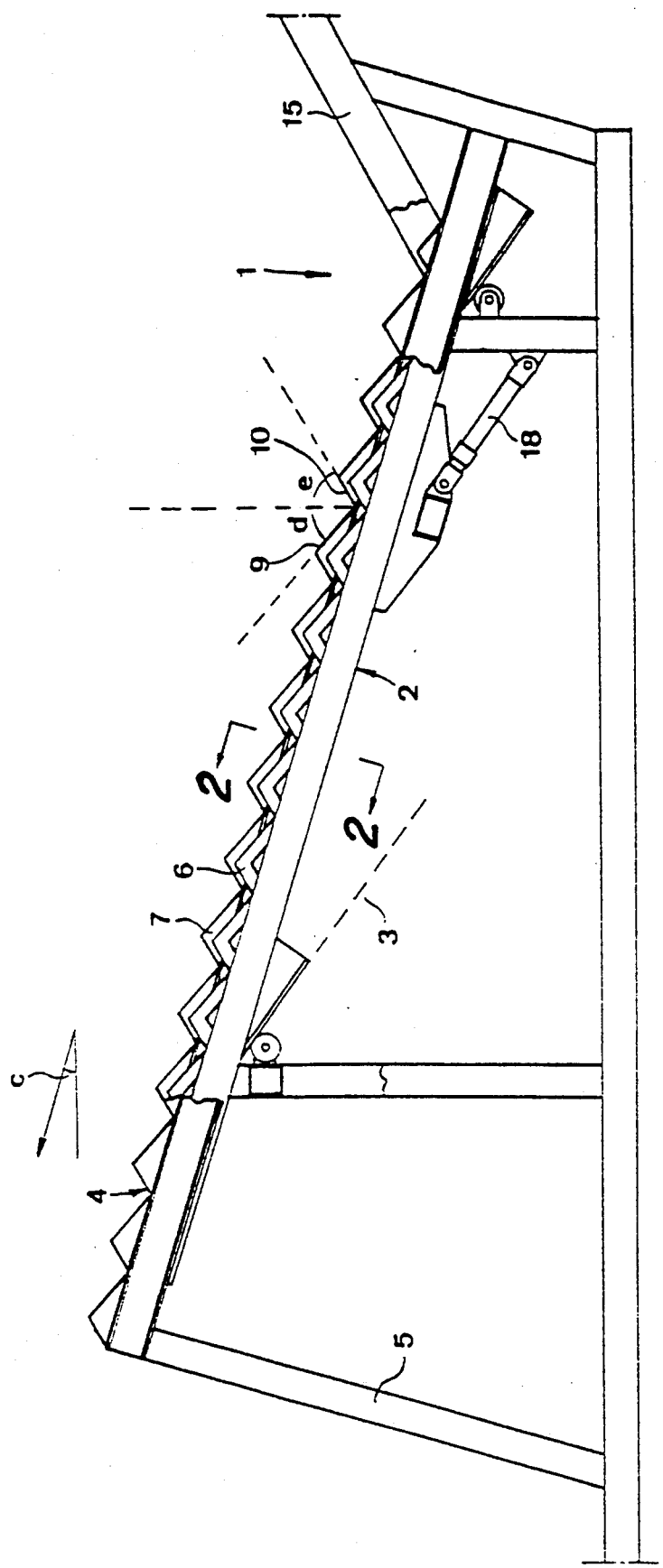
FIG. 1 is a partly cut side view illustrating the device according to the invention.

The device according to the invention for dividing a collection of elongated wood pieces, in particular round timber pieces, and piecemeal cross feeding thereof in a direction away from the collection place indicated at 1 in FIG. 1 comprises a feeding arrangement 2 which is moveable reciprocatingly in a substantially rectilinear, sloping movement part 3 for feeding the wood pieces along a rising support path 4. The support path 4 is stationarily arranged on a frame 5.

As is most clearly apparent from FIG. 4 and 5, the feeding arrangement 2 as well as the support path 4 have a stairs-like design with a plurality of steps 6 and 7 respectively, which in profile have substantially equal form, preferably identical form, and each of which comprises a first portion 9 sloping upwardly in the direction 8 of rise of the support path, said first portion being followed by a downwardly sloping second portion 10.

Two adjacent steps 6 and 7 respectively on the feeding arrangement and support path form V-shaped seats, in which the wood pieces are intended to be received. Each of these seats is, accordingly, formed by the second portion 10 of one step and the first portion 9 of a step following thereupon in the direction of rise. As appears from FIG. 1 the step portion 9 then forms an angle d relative to a vertical plane which is smaller than the angle e of the step portion 10. It has, in practice, turned out to be suitable to have the angle d within the range 40°–60°, whereas the angle e should be within the range 50°–70°.

The length of an upwardly sloping portion 9 of the steps 6 and 7 respectively is denoted $l_1$ in FIG. 4, whereas the length of a downwardly sloping portion 10 is denoted $l_2$. Thus, these lengths are equal for all steps. Furthermore, the portions 9 are substantially mutually parallel for all steps 6, 7 and the same applies for portions 10. The steps 6, 7 of the feeding arrangement 2 and support path 4 are mutually displaced with a measure which, measured parallel to the length or depth $l_2$ of the step portions 10, is smaller than this length.

The first portions 9 of the steps 6, 7 of the feeding arrangement 2 as well as the support path 4 have a steeper slope than the movement path 3. This slope difference is denoted in FIG. 4. The differential angle a may amount to 1°–15°. The angle a is suitably between 2° and 10°, preferably 4°–8°.

The slope b of the movement path 3 is suitably 20°–50°, preferably 25°–45°. The angle b is about 35° in the embodiment. The angle c of rise of the support path 4 and feeding arrangement 2 is suitably 5°–40°, preferably 10°–25°. The angle of rise is about 16° in the example.

The reciprocating movement of the feeding arrangement 2 has a length exceeding the length $l_1$ of the first portions 9 of the steps 6, 7. This appears immediately on a study of FIG. 4, where the feeding arrangement 2 is illustrated in its lower position by full lines and the position of the steps 6 in the upper end position of the feeding arrangement is illustrated with a dashed line.

The slope difference a between the portions 9 of the steps 6, 7 and the movement path 3 will cause the feeding arrangement 6 to move obliquely relative to portions 9 of the support path. This oblique movement is drawn with dot and dash lines in FIG. 4 and illustrates the movement of the step points of the feeding arrangement 2.

As appears from FIG. 4, the second portions 10 of the steps 6 of the feeding arrangement 2 will on movement upwardly of the feeding arrangement project outwardly of those portions 9 of the steps 7 of the support path which above said second portions 10 are most adjacently located with a measure indicated at $f_1$, in the situation, where the second portions 10 of the steps 6 of the feeding arrangement pass by the corresponding portions 10 of the support path and when a contact against a wood piece is intended to take place.

This measure $f_1$ is larger than half of the length $l_2$ of portions 10. As the feeding arrangement moves towards its upper end position this projection decreases so that when portions 10 of the steps 6 of the feeding arrangement just pass by the portion 10 of a step of the support path lying above said step 6, the projection is equal to $f_2$. This projection measure $f_2$ is smaller than one half of the length $l_2$ of the portions 10 of the steps 6 and 7. In the middle of the movement upwardly of the feeding arrangement the portions 10 of the steps 6 of the feeding arrangement will project outwardly of the portions 9 of the steps of the support path with a measure $f_4$, which is approximately equal to one half of the length $l_2$ of the portions 10 of the steps 6 and 7.

When the portions 10 of the steps 6 of the feeding arrangement, in the beginning of the return movement of the feeding arrangement, are flush with the portions 10 of the steps 7 of the support path, the portions 10 of said steps 7 will protrude with the measure $f_3$ beyond the portions 9 which are located there above steps 7 of the support path. The measure $f_3$ is larger than one half of the length $l_2$ of the portions 10 of the steps 6, 7.

Figure 2:
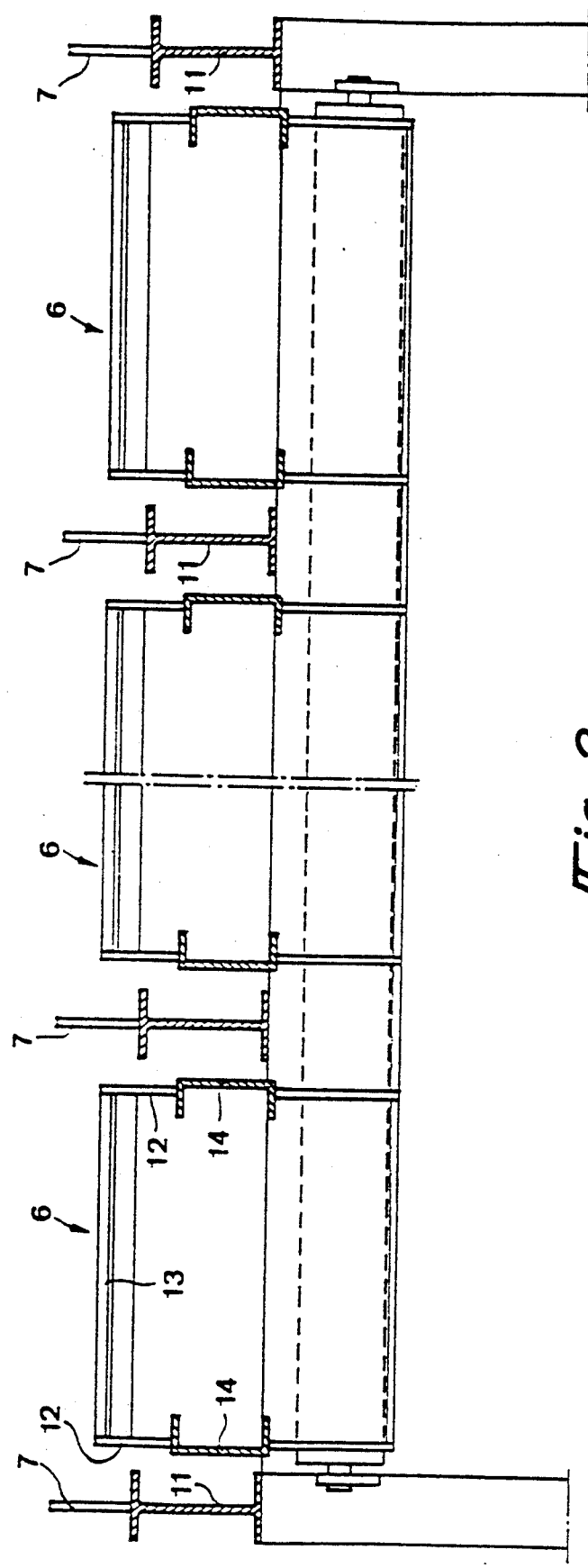
FIG. 2 is a diagrammatical section along the line II—II in FIG. 2.
Figure 3:
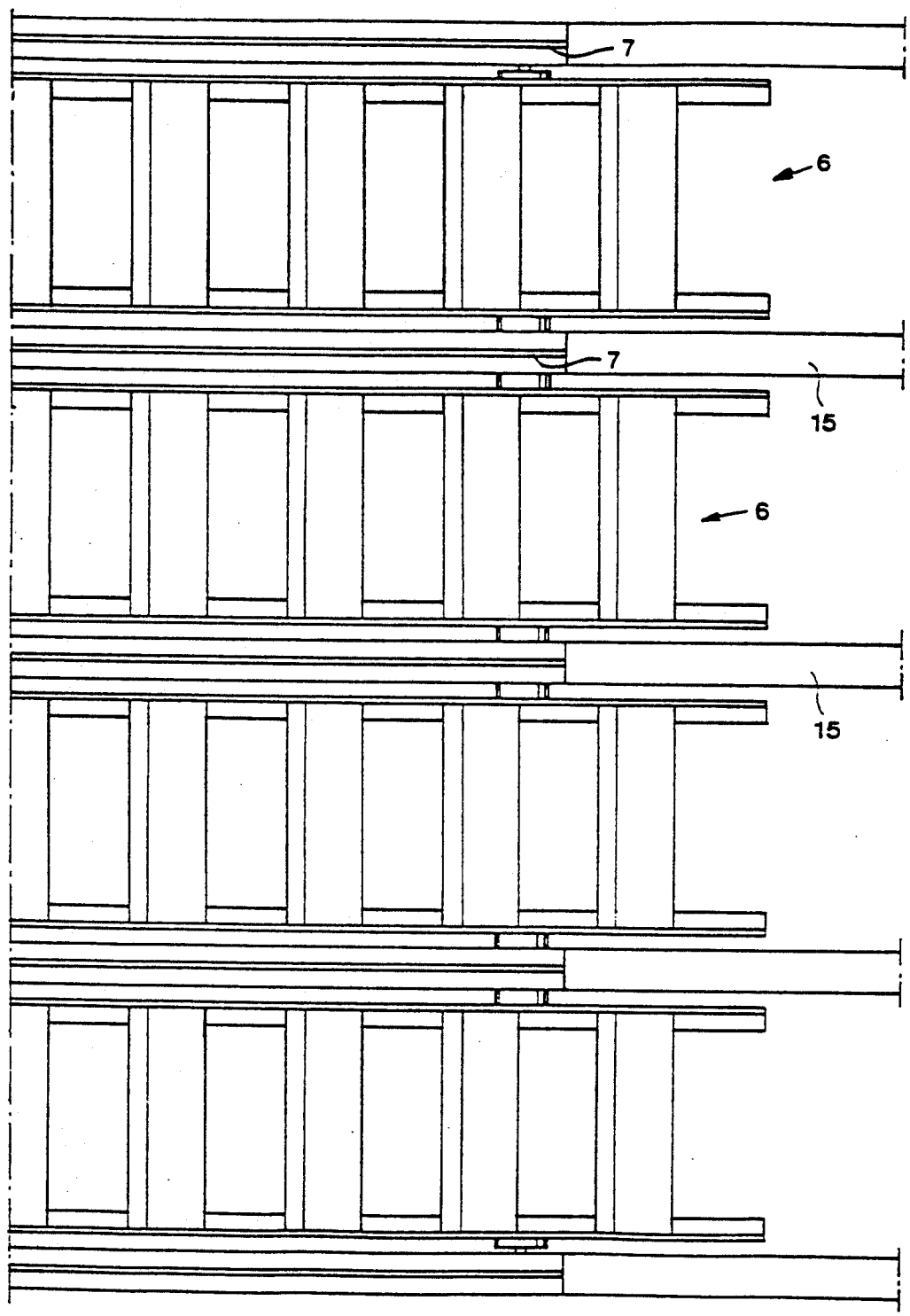
FIG. 3 is a view of the device according to FIG. 1 viewed from above.

As appears most clearly from FIG. 2, the steps 7 of the support path are formed by plate elements secured to beams 11 extending longitudinally in the device. An arbitrary number of laterally separated step formations may occur as appears from FIGS. 2 and 3. Between each pair of step formations 7 there are step formations 6 contained in the feeding arrangement. These step formations 6 are relatively wide in the lateral direction of the feeding arrangement in contrast to the step formations 7, which are relatively thin in this direction. Each step formation 6 may comprise gable pieces 12 which are produced by plate elements and which are mutually separated and between which profiles 13 extend, which in a manner appearing from FIG. 4 may have a different design. The step-like gable pieces 12 are secured on beams 14 extending in the longitudinal direction of the device.

The collection place 1 for wood pieces indicated in FIG. 1 has the character of a V-shaped seat or pocket, one shank of which is formed by the lower portions of the support path and the feeding arrangement and the other shank of which is formed by beams or similar members 15, which are secured to the frame 5 and the lower ends of which adjoin to the beams 11, on which the step formations or step elements 7 contained in the support path are attached.

As appears from FIGS. 4 and 5, the support path 3 is defined by gradient planes 16 arranged on the feeding arrangement 2 and rollers 17 stationarily arranged on the frame 5 of the device. Power means 18 (FIG. 1) act between the feeding arrangement 2 and the frame 5 for producing the reciprocating movement of the feeding arrangement. These power means may for example be formed by means variable in length, such as one or more piston cylinder mechanisms.

The invention described operates in the following manner. Wood pieces are deposited in the collection pocket 1 by means of a conveyor, a loading machine or the like in a collection, in which the wood pieces are in disorder although normally orientated in parallelism. On movement upwardly of the feeding arrangement 2, with its lower position as a starting point, wood pieces will be caught by the portions 10 on the steps 6 of the feeding arrangement. The wood pieces will be displaced upwardly along the portions 9 of the steps 7 of the support path until the portions 10 of the steps 6 of the feeding arrangement reach beyond the respective step points of the steps 7 of the support path. The wood pieces then roll downwardly along the portions 10 of the steps 7 to contact against the portions 9 of the steps 6 of the feeding arrangement. When the feeding arrangement thereafter carries out its return movement, the wood pieces will be prevented from rolling downwardly along the device by means of the portions 10 of the steps 7 of the support path, said portions 10 then projecting beyond the adjacent portions 9 of the steps 6 of the feeding arrangement so that the wood pieces will roll or slide on the latter portions 9 until the feeding arrangement approaches its lowermost position, when the wood pieces are released to roll downwardly into contact against the portions 10 of the steps 7 of the support path so that the wood pieces assume the position indicated in FIG. 4. In other words, a movement sequence upwardly/downwardly of the feeding arrangement will, accordingly, cause movement of the wood pieces one step upwardly along the support path 4. By means of an adequate choice of length $l_2$ of the portions 10 of the steps 6 and 7 in relation to the coarseness of the occurring wood pieces, a very safe piecemeal splitting of the wood pieces can be obtained in the manner more closely described in our patent publication No. 449 476. The construction of the device involves the consequence that if two or more wood pieces would tend to be brought forward in one single seat formed by a portion 9 and a portion 10 on movement upwardly of the feeding arrangement, the wood pieces in addition to one single will tend to roll back downwardly along the device so that one single wood piece will be delivered at the upper end of the device, for instance, to a receiving conveyor or the like, on each movement upwardly of the feeding arrangement.

A high speed of the feeding arrangement and accordingly a high capacity of the device may be obtained by the steps 6 of the feeding arrangement projecting ($f_1$) with their portions 10 more than one half of the length $l_2$ beyond the step portions 9 of the support path at the time of contact against the wood pieces, said projection successively decreasing until the wood pieces pass over the step points of the support path. On the subsequent return movement, the step portions 10 of the support path will initially act withholdingly on the wood pieces by means of the projection $f_3$ beyond the step portions 9 of the feeding arrangement so that the wood pieces do not inadvertently roll backwardly along the device.

The measure $f_3$ also exceeds one half of the length $l_2$ of the step portions 10.

It is evident that the device described may be modified in several ways within the scope of the invention.

I claim:

1. A device for dividing a collection of elongated wood pieces, in particular round timber pieces, and piecemeal cross feeding thereof in a direction away from the collection place (1), said device comprising a feeding arrangement (2), which is moveable reciprocatingly in a substantially rectilinear, sloping movement path (3) for feeding the wood piece along a rising support path (4), the feeding arrangement and support path both having a stairs-like design with a plurality of steps (6 and 7), which in profile have a substantially equal form and each of which comprises a first portion (9) sloping upwardly in the direction of rise of the support path followed by a downwardly sloping second portion (10), the first portions (9) of the steps (6 and 7) of the feeding arrangement (2) and the support path (4) being mutually displaced with a measure smaller than the length ($l_2$) of the second portions (10), characterized in that the first portions (9) of the steps (6 and 7) of the feeding arrangement (2) as well as the support path (4) are sloping more steeply than the movement path (3).

2. A device according to claim 1, characterized in that the slope of the first portions (9) of the steps (6 and 7) is 2°–10°, preferably 4°–8°, steeper than the slope of the movement path (3).

3. A device according to claim 1, characterized in that the slope of the movement path (3) is 20°–50°, preferably 25°–45°.

4. A device according to claim 1, characterized in that the rise of the support path (4) is 5°–40°, preferably 10°–25°.

5. A device according to claim 1, characterized in that the first portions (9) the steps (6 and 7) of the feeding arrangement (2) and the support path (4) are mutually displaced, when the second portions (10) of the steps (6) of the feeding arrangement are located approximately in the middle area of the first portions (9) of the steps (7) of the support path, with a measure which is substantially equal to a half of the length ($l_2$) of the second portions (10).

6. A device according to claim 1, characterized in that the support path (3) is defined by gradient planes (16) arranged on the feeding arrangement (2) and rollers (17) stationarily arranged on a frame of the device.

* * * * *